(12) United States Patent
Lepikhin

(10) Patent No.: US 8,970,619 B2
(45) Date of Patent: Mar. 3, 2015

(54) PARALLELIZED GENERATION OF SUBSTANTIALLY SEAMLESS IMAGE MOSAICS

(75) Inventor: Maksim Lepikhin, Superior, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 647 days.

(21) Appl. No.: 12/625,260

(22) Filed: Nov. 24, 2009

(65) Prior Publication Data

US 2011/0122145 A1    May 26, 2011

(51) Int. Cl.
| G09G 5/00 | (2006.01) |
| G09G 5/02 | (2006.01) |
| G09G 5/14 | (2006.01) |
| G06T 11/60 | (2006.01) |

(52) U.S. Cl.
CPC .. *G09G 5/02* (2013.01); *G09G 5/14* (2013.01); *G06T 11/60* (2013.01); *G09G 2340/12* (2013.01); *G09G 2360/16* (2013.01)
USPC ............ 345/629; 345/643; 345/589; 345/423

(58) Field of Classification Search
USPC .................................. 345/589, 643, 423, 629
See application file for complete search history.

(56) References Cited

U.S. PATENT DOCUMENTS

| 6,239,596 | B1 | 5/2001 | Stupak, Jr. et al. |
| 6,400,849 | B1 * | 6/2002 | Lee et al. ................... 382/260 |
| 6,956,974 | B1 * | 10/2005 | Ito et al. ..................... 382/240 |
| 6,973,212 | B2 | 12/2005 | Boykov et al. |
| 7,536,050 | B2 | 5/2009 | Boykov et al. |
| 7,599,790 | B2 | 10/2009 | Rasmussen et al. |
| 2005/0147322 | A1 * | 7/2005 | Saed .............................. 382/284 |
| 2006/0029275 | A1 | 2/2006 | Li et al. |
| 2007/0237420 | A1 * | 10/2007 | Steedly et al. ................ 382/284 |
| 2008/0123994 | A1 | 5/2008 | Schultz et al. |
| 2008/0187305 | A1 | 8/2008 | Raskar et al. |

OTHER PUBLICATIONS

Boykov et al. (Graph Cuts in Vision and Graphics: Theories and Applications, Math. Models of C.Vision: The Handbook, 2006).*
Lombaert (Energy Minimization with Graph Cuts, 2006, http://step.polymtl.ca/~rv101/energy/).*

(Continued)

*Primary Examiner* — Maurice L McDowell, Jr.
*Assistant Examiner* — Kyle Zhai
(74) *Attorney, Agent, or Firm* — Steven Spellman; Jim Ross; Micky Minhas

(57) ABSTRACT

Many computing services incorporate large mosaics of geolocated images. For example, a user may access and interact with a digital image map comprising thousands of digital images mosaiced together. It may be advantageous to parallelize mosaic creation by splitting the mosaic into tiles, and processing the tiles independently from one another. Unfortunately, visual artifacts between image boundaries may result because of the independent processing. Accordingly, one or more systems and/or techniques for generating a substantially seamless mosaic tile are disclosed herein. A mosaic tile comprising one or more intersecting images may be received. Pair-wise image segmentation may be executed upon pairs of intersecting images within the mosaic tile to generate seam lines between the pair of intersecting images. The seam lines are used to compose the mosaic tile. A constrained alpha-expansion algorithm is executed upon hole regions within the composed mosaic to generate a substantially seamless mosaic.

20 Claims, 12 Drawing Sheets

(56) References Cited

OTHER PUBLICATIONS

Boykov et al. (Fast Approximate Energy Minimization via Graph Cuts, 1999).*

"Fast Image Blending using Watersheds and Graph Cuts", Image and Vision Computing, Nuno Gracias, Mohammad Mahoor, Shahriar Negahdaripour and Arthur Gleason, Apr. 24, 2008, reprinted from the Internet at: http://users.isr.ist.utl.pt/~ngracias/publications/IMAVIS_2715.pdf. 11 pgs.

"A Multilevel Banded Graph Cuts Method for Fast Image Segmentation", Herve Lombeaert, Yiyong Sun, Leo Grady and Chenyang Xu, Proceedings of the Tenth IEEE International Conference on Computer Vision, ICCV, vol. 1, Oct. 17-21, 2005, 7 pgs.

"Image Seaming for Segmentation on Parallel Architecture", Ming-Hua Chen and Theo Pavlidis, IEEE Transactions on Pattern Analysis and Machine Intelligence, vol. 12, No. 6, Jun. 1990, 7 pgs.

* cited by examiner

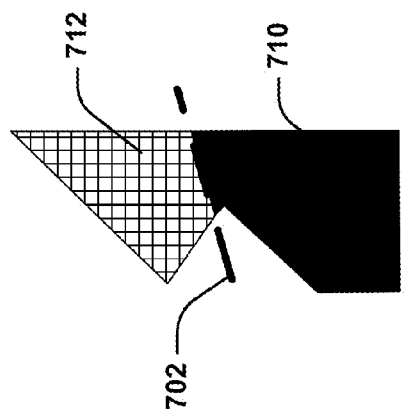
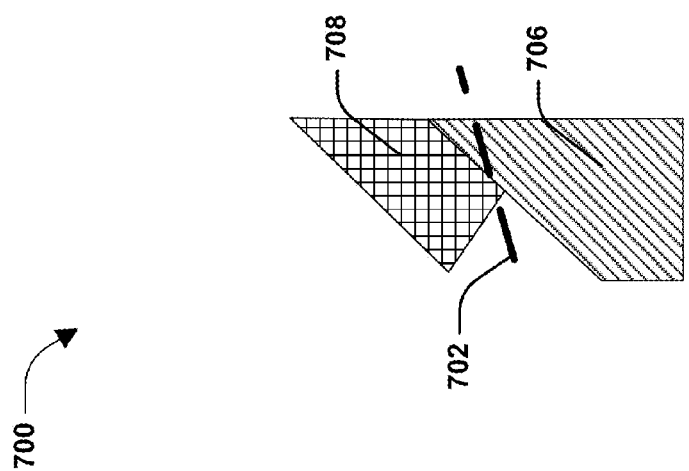
FIG. 7

PARALLELIZED GENERATION OF SUBSTANTIALLY SEAMLESS IMAGE MOSAICS

BACKGROUND

Today, 2-dimensional image processing is utilized in many applications. For example, websites and web services provide robust map experiences for users through 2-dimensional image processing. In particular, some mapping services may allow a user to view digital images of locations projected on digital elevation models representing terrain. In this way, a user may interact with maps displaying digital images of the actual environment in which the user is interested. In one example of generating these maps, oblique digital images of a location may be collected (e.g., a series of oblique images of a location may be taken from an air plane). The oblique images may be used in a rectification process to project the oblique images into a single coordinate system covering terrain, thus generating a single map comprising digital images of the location. Unfortunately, the process of projecting multiple images together in a single coordinate system may cause distortions due to the different points of view from which the images were taken. That is, the images may not align properly because of these distortions, thus boundaries between images may become distorted.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for generating a substantially seamless mosaic tile is disclosed herein. A mosaic tile comprising one or more images intersecting the mosaic tile may be received. It may be appreciated that images (e.g., thousands of digital images of an actual location or an object) may be projected into a single coordinate system. It may be appreciated that the mosaic tile may be just one of many mosaic tiles of a mosaic image. Splitting a mosaic image into mosaic tiles allows for concurrent processing of mosaic tiles. That is, multiple processes can be performed on an image concurrently since the image is split into tiles and different tiles can be processed concurrently.

The mosaic tile may be composed using segmented pairs of intersecting images intersecting the mosaic tile. The pairs of intersecting images may be segmented based upon one or more graph algorithms. In one example of segmentation, for pairs of intersecting images (e.g., a first image intersecting and/or overlapping a second image), pair-wise image segmentation may be executed upon a pair of intersecting images to generate a seam line between the pair of intersecting images based upon a node to pixel location assignment. The seam line represents a boundary between the pair of intersecting images. In one example of implementing pair-wise image segmentation, a graph comprising nodes representing pixel locations of an intersection area of a pair of intersecting images and edges representing costs between adjacent nodes may be created. The graph may be cut along a set of edges that separate the graph into two connected sub-graphs and minimize total seam cost for the set of edges to generate a seam line between the pair of intersecting images. To cut the graph, nodes may be assigned to either source node or sink node based upon a maxflow/mincut algorithm, thus generating a seam line between nodes assigned to the first image and nodes assigned to the second image. It may be appreciated that the pair-wise image segmentation may allow for parallel processing of pairs of intersecting images because it does not depend on other images and thus makes image segmentation local to the area of the two images.

The mosaic tile may be composed from images overlapping with the mosaic tile based upon the seam lines between respective pairs of intersecting images. In particular, image regions (pixels associated with nodes assigned to a particular image during pair-wise segmentation) may be intersected. It may be appreciated that in one example, image regions may be interpreted as sets of graph nodes created during pair-wise segmentation. During intersection, a subset of nodes within the mosaic tile may retain their image assignment because the nodes within the subset of nodes belong to no more than one (e.g., exactly one) image region, for example. Nodes outside of the subset of nodes are designated as unassigned nodes because they may belong to more than one image or they may belong to no images at all.

Unassigned sets of nodes or "holes" may result because the mosaic tile is composed using seam lines of independently processed pairs of intersecting images, which may result in overlap. Nodes may be assigned to more than one image because of the overlap. Nodes assigned to more than one image region are designed as unassigned. To assign the unassigned nodes (e.g., fill the "holes"), an alpha-expansion algorithm may be executed upon hole regions within the composed mosaic tile to generate a substantially seamless mosaic. It may be appreciated that the alpha-expansion algorithm may be constrained by node to pixel location assignments on the boundaries of the hole regions. That is, the alpha-expansion algorithm may be restricted from altering the assignment of nodes already assigned to an image. This may be done by assigning very large costs to respective edges. In one example of executing the alpha-expansion algorithm, for unassigned nodes within the hole region, unassigned nodes may be assigned to an image based upon costs defined on graph edges (e.g., edges within a graph comprising nodes representing pixel locations in the hole region and edges comprising costs between adjacent nodes). The constrained alpha-expansion algorithm fills holes in mosaic tiles to produce a substantially seamless mosaic tile, which may be used in generating a substantially seamless mosaic.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 7 is an illustration of an example of generating a seam line between a pair of intersecting images using pair-wise image segmentation.

DETAILED DESCRIPTION

Figure 1:
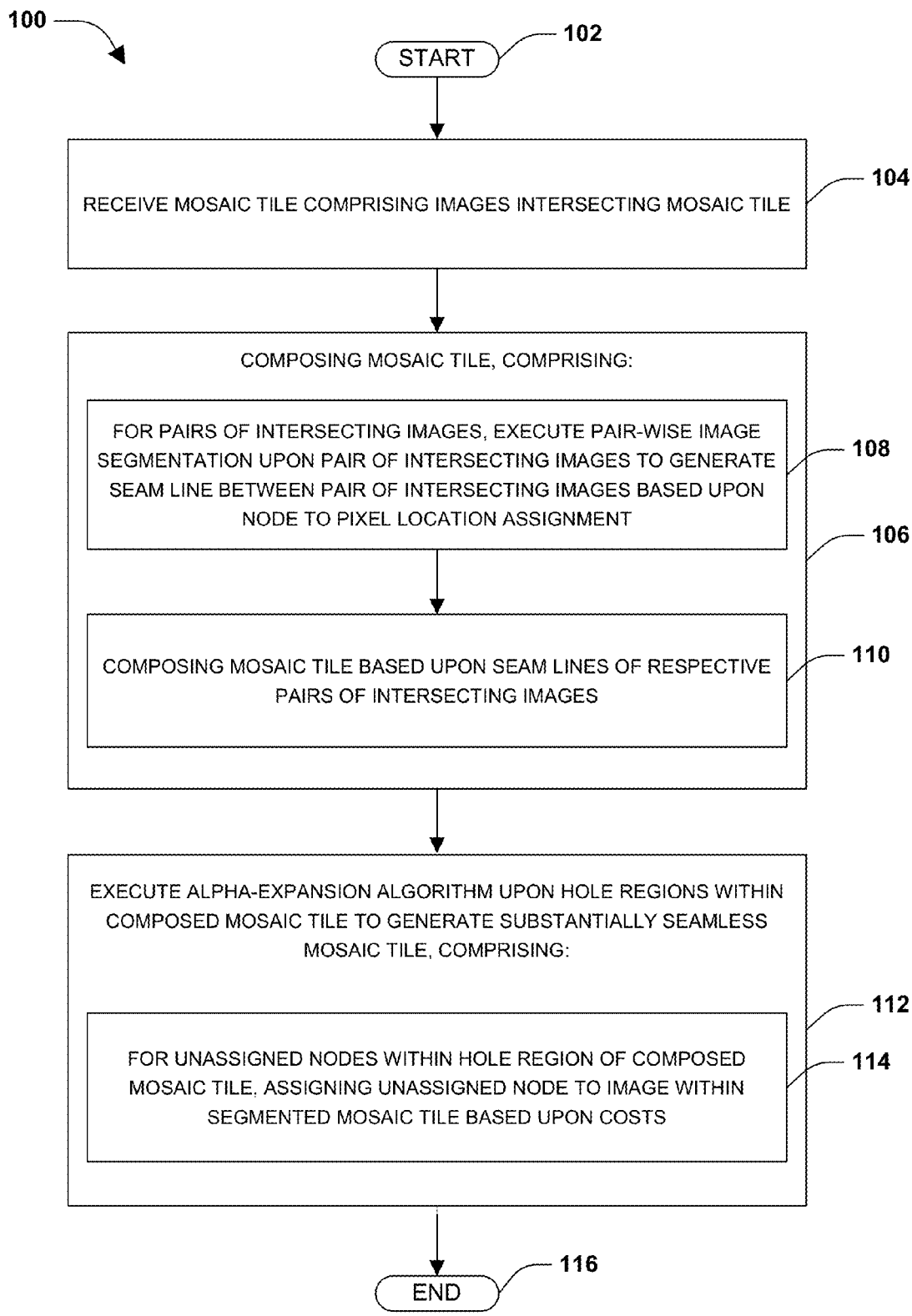
FIG. 1 is a flow chart illustrating an exemplary method of generating a substantially seamless mosaic tile.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Generation of an image mosaic (e.g., a geolocated image of a city) from multiple digital images (e.g., geolocated digital photos of the city) is but one application of 2-dimensional image processing. The techniques for placing and aligning the digital images into a single coordinate system (e.g., a digital elevation model representing the terrain of the city) may involve intense resource usage due to the large number of digital images (e.g., thousands of images). Furthermore, attempts to process the digital images in parallel (e.g., the use of one or more mosaic tiles of intersecting geolocated digital images) may produce distortions and display artifacts when placing and aligning independently processed mosaic tiles together into a single image mosaic. Thus, it may be advantageous to parallelize the processing of mosaic tiles when generating an image mosaic, while maintaining a continuous or substantially seamless boundary between the mosaic tiles. This may reduce distortion along boundaries between mosaic tiles and images. It may be appreciated that generation of image mosaics is not limited to the application of geolocated image mosaics, but may apply to other applications where multiple digital images, such as images of objects, are mosaiced together.

Accordingly, one or more systems and/or techniques for generating a substantially seamless mosaic tile are provided herein. The technique described herein may allow for parallel processing of a mosaic area by splitting the mosaic area into mosaic tiles that may be independently processed. A mosaic tile may comprise one or more images intersecting the mosaic tile. During processing, pair-wise image segmentation is performed on pairs of intersecting images to generate desirable seam lines between the pairs of images. The mosaic tile may be composed based upon the seam lines of the pairs of intersecting images. It may be appreciated that in one example, the mosaic tile is composed by intersecting the resulting image regions of the pair-wise image segmentation. In this way, nodes (e.g., nodes of a graph representing pixel locations of an intersection area of a pair of intersecting images) assigned to no more than one image are retained, while nodes assigned to more than one image are designated as unassigned nodes ("holes"). An alpha-expansion algorithm may be utilized to assign the unassigned nodes (e.g., "fill the holes"). It may be appreciated that the alpha-expansion algorithm may be constrained based upon previous node to pixel location assignments generated by the pair-wise image segmentation.

It may be appreciated that in one embodiment image data that is processed with regard to a particular mosaic tile may comprise image data corresponding to an image that extends beyond the boundaries of that mosaic tile. For example, if image data within a first mosaic tile is being processed, but some of the image data corresponds to a first image and that first image extends to a certain degree into an adjacent mosaic tile, then the image data that is processed with regard to that first mosaic tile may also include image data corresponding to the portion of the first image that extends into the adjacent tile. It may be appreciated that in such a situation, the area that is processed may be referred to as a working area, for example, since it is not necessarily confined to the boundaries of the mosaic tile. It may also be appreciated that such a "working area" is not limited to a single portion of a single image that extends into a single adjacent mosaic tile, but may also include, for example, one or more portions of one or more images that extend into one or more adjacent mosaic tiles. That is, while what is output after one or more of the processes described herein is generally described on a tile by tile basis or within the confines of boundaries of respective tiles, one or more of the processes themselves may not be so confined, but may instead extend beyond the boundaries of the mosaic tiles (e.g., operate on data from outside the boundaries of respective tiles). By way of further example, where a hole is created (e.g., via pairwise segmentation) that extends beyond the boundary of a mosaic tile (e.g., working area extended beyond the boundary of the tile), alpha-expansion can (concurrently) be performed on this area of the adjacent tile to fill this portion of the hole as well. Thus, while mosaic tiles are tools that are used herein, the processing described herein is not meant to be constrained or otherwise unduly limited by the implementation of said tiles. Stated another way, any one or more of the processes described herein may be applied to a working area, and thus are not constrained to merely the area defined by the boundaries of any one or more of the tiles.

One embodiment of generating a substantially seamless mosaic tile is illustrated by an exemplary method 100 in FIG. 1. At 102, the method begins. At 104, a mosaic tile comprising one or more images intersecting the mosaic tile may be received. It may be appreciated that a mosaic may be split into multiple mosaic tiles that may be processed concurrently. For example, a mosaic 300 in FIG. 3 may comprise multiple mosaic tiles (e.g., a mosaic tile 302 of FIG. 3 and/or other mosaic tiles represented by the dashed lines).

At 106, the mosaic tile may be composed. It will be appreciated that composing, as used herein, is not meant to be interpreted strictly as creating or generating a tile, but is instead meant to pertain to one or more processes wherein images (or portions thereof) that intersect a tile are rearranged, where the images are rearranged relative to one another within the tile based upon their respective seam lines generated through pairwise segmentation. In particular, at 108, for pairs of intersecting images, pair-wise image segmentation may be executed upon a pair of intersecting images to generate a seam line between the pair of intersecting images based upon a node to pixel location assignment (see e.g., FIGS. 5-8). That is, seam lines may be generated between pairings of images that intersect one another within the mosaic tile.

In one example of pair-wise image segmentation, a graph comprising nodes representing pixel locations of the intersection area of the pair of intersecting images and edges representing costs (e.g., pixel color difference, intensity gradient, and/or other costs derived from images) between adjacent nodes may be generated. The graph may be cut to generate a seam line between the pair of intersecting images. In particular, for respective nodes, a node may be assigned to either source or sink node based upon maxflow/mincut algorithm. It may be appreciated that graph nodes correspond to image pixel locations and thus segmentation of the graph into two graphs creates a segmentation of the region covered by the pair of images. In this way, seam lines may be generated between pairs of intersecting images based upon the node to pixel location assignments.

Figure 9:
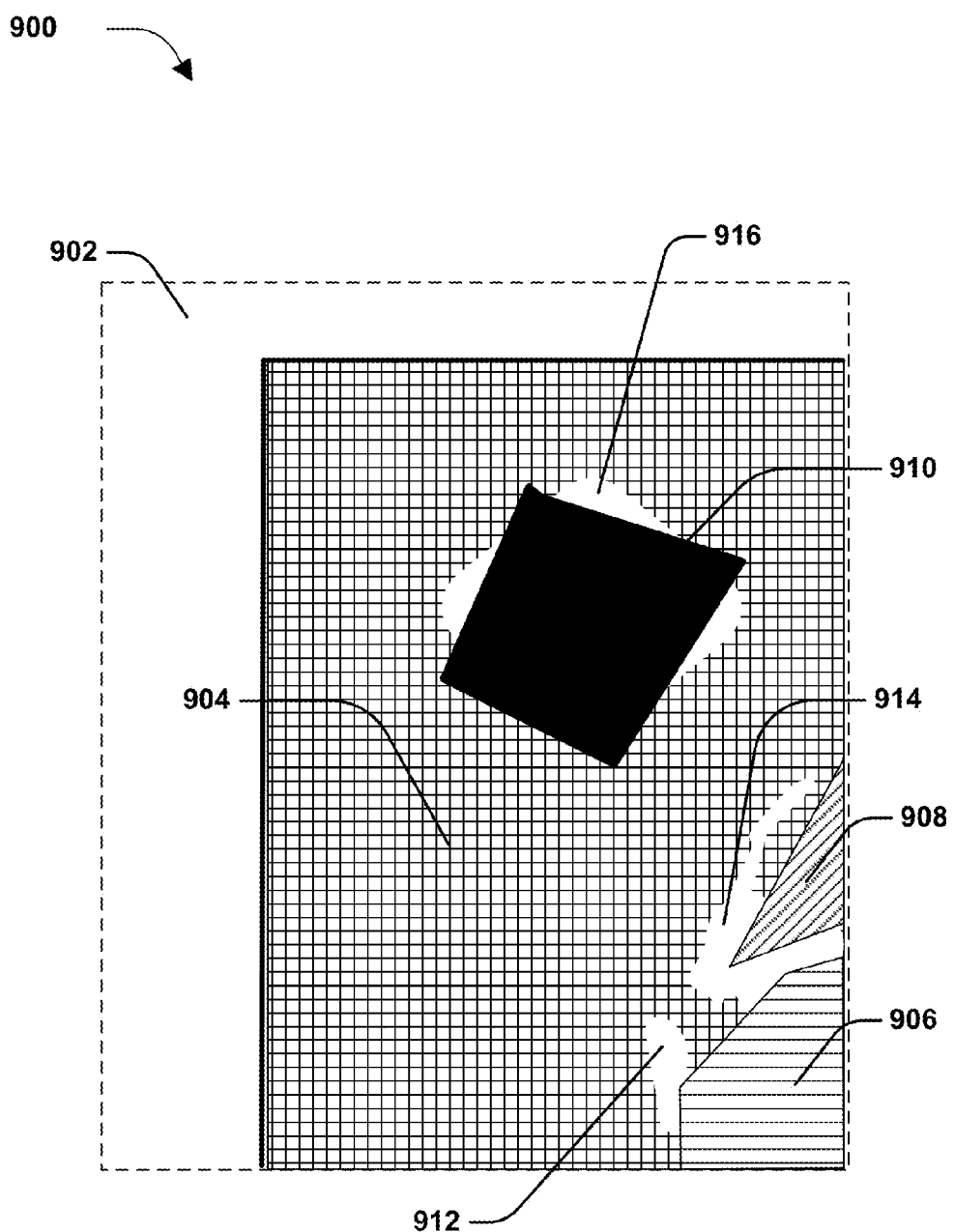
FIG. 9 is an illustration of an example of composing a mosaic tile based upon seam lines of corresponding pairs of intersecting images.

At 110, the mosaic tile may be composed based upon seam lines of respective pairs of intersecting images (see generally FIG. 9 for an example of composing a mosaic tile). In particular, image regions (e.g., an image region comprising nodes assigned to a particular image during pair-wise image segmentation) may be intersected within the mosaic tile based upon their respective seam lines. In one example, for respective images within the mosaic tile, image regions overlapping at least a portion of an image may be intersected with the image based upon respective seam lines of the one or more overlapping image regions.

In another example of pair-wise image segmentation, for pairs of intersecting images, pair-wise image segmentation may be executed upon a pair of intersecting images to generate a seam line between a first image region corresponding to a first image of the pair of intersecting images and a second image region corresponding to a second image of the pairing of intersecting images.

It may be appreciated that a node to pixel location assignment of a subset of nodes within the mosaic tile may be retained based upon nodes within the subset of nodes belonging to no more than one image (e.g., an image region corresponding to an image). Nodes outside of the subset of nodes may be designated as unassigned nodes. It may be appreciated that the unassigned nodes may be interpreted as "holes" within the mosaic tile because no image is supplying pixel data to the unassigned nodes.

Figure 10:
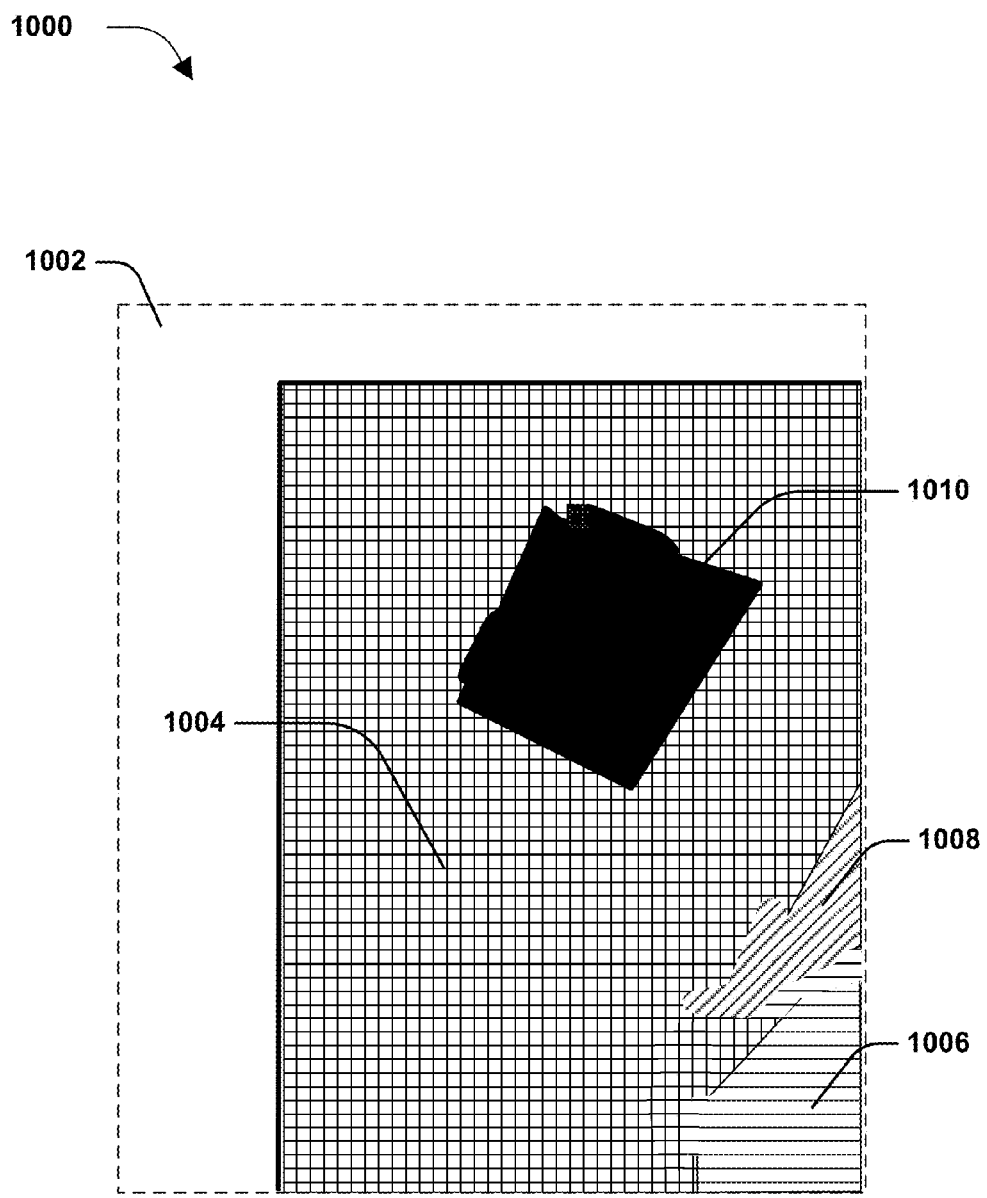
FIG. 10 is an illustration of an example of generating a substantially seamless mosaic tile using an alpha-expansion algorithm.

At 112, an alpha-expansion algorithm may be executed upon hole regions within the composed mosaic tile to fill holes in the composed mosaic tiles (see generally FIG. 10 for an example). In particular, at 114, for unassigned nodes within a hole region of the composed mosaic tile, unassigned nodes may be assigned to an image within the composed mosaic tile based upon costs defined by edges of unassigned nodes. That is, unassigned nodes may, in one example, be interpreted as "holes" that do not have pixel data of an image assigned to them. It may be appreciated that unassigned nodes may be generated from pair-wise image segmentation and/or composing of the mosaic tile. In this way, unassigned nodes are assigned to an image, thus filling the holes with pixel data from a single image. The alpha-expansion algorithm may be constrained based upon node to pixel location assignments. That is, the alpha-expansion algorithm may be restricted from changing the assignment of nodes already assigned to an image. At 116, the method ends. It may be appreciated that a mosaic image may be generated based upon one or more substantially seamless mosaic tiles generated concurrently. The mosaic image may be presented to a user.

Figure 2:
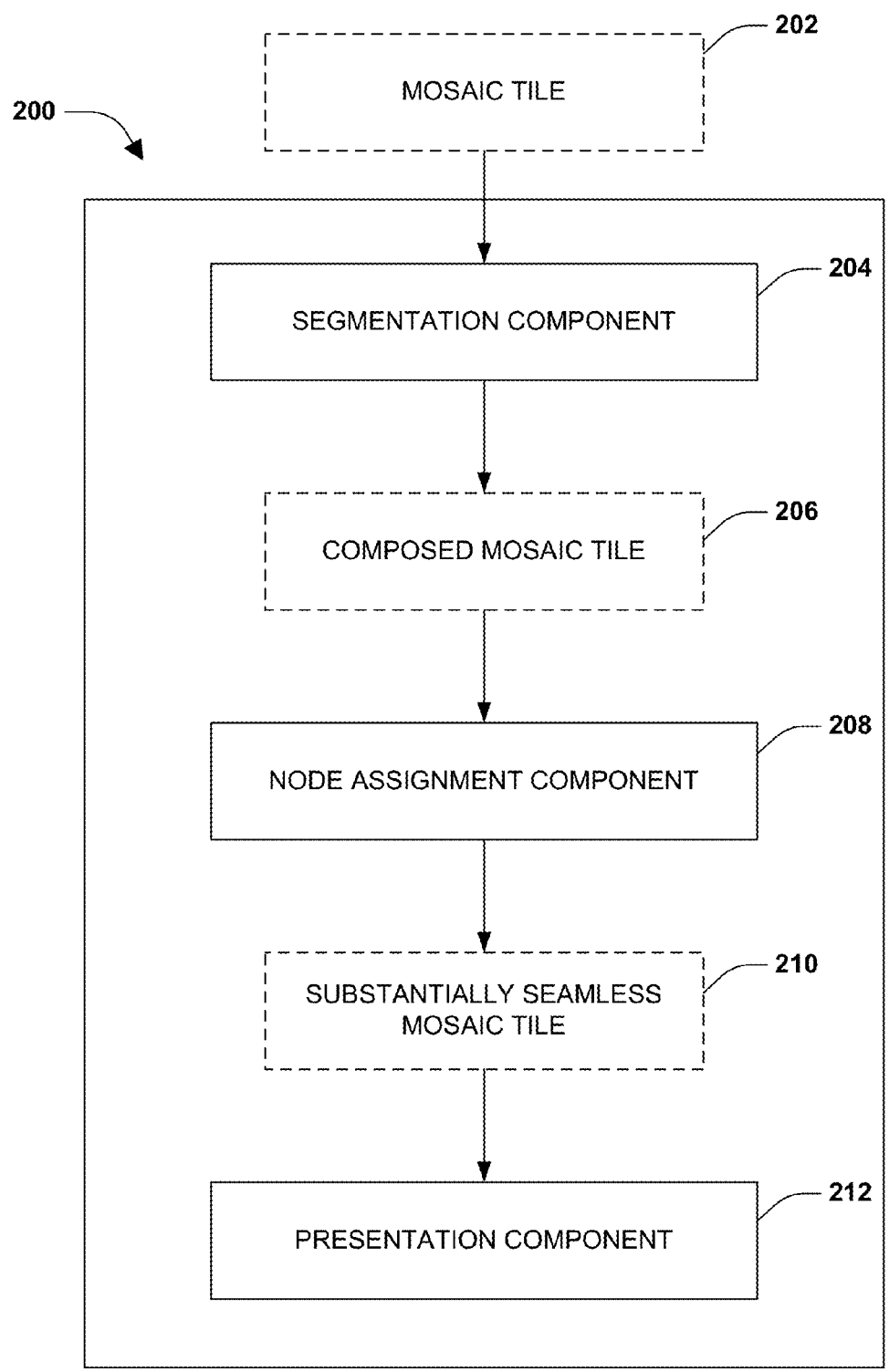
FIG. 2 is a component block diagram illustrating an exemplary system for generating a substantially seamless mosaic tile.

FIG. 2 illustrates an example of a system 200 configured for generating a substantially seamless mosaic tile. The system 200 may comprise a segmentation component 204, a node assignment component 208, and/or a presentation component 212. It may be appreciated that the segmentation component 204 may be configured to compose multiple mosaic tiles concurrently. The segmentation component 204 may be configured to receive a mosaic tile 202 comprising one or more images intersecting the mosaic tile 202. The segmentation component 204 may be configured to execute pair-wise image segmentation upon pairs of intersecting images within the mosaic tile 202 to generate seam lines between the pairs of intersecting images based upon node to pixel location assignments. For example, the segmentation component 204 may be configured to generate a graph comprising nodes representing pixel locations of an intersection area of a pair of intersecting images and edges representing costs (e.g., pixel color difference, intensity gradient, etc.) between adjacent nodes. The segmentation component 204 may assign nodes to either a first image node of a first image or a second image node of a second image based upon a maxflow/mincut algorithm, thus generating node to pixel location assignments for nodes corresponding to the pair of intersecting images. In this way, the segmentation component 204 generates seam lines between pairs of intersecting images based upon the node to pixel location assignments.

The segmentation component 204 may be configured to compose the mosaic tile 202 to generate a composed mosaic tile 206. The segmentation component 204 may compose the mosaic tile 202 based upon seam lines of pairs of intersecting images within the mosaic tile 202 (e.g., seam lines generated by pair-wise image segmentation). In one example, the segmentation component 204 may intersect one or more image regions (e.g., an image or a portion thereof) overlapping at least a portion of an image based upon respective seam lines of the one or more image regions. In this way, a composed mosaic tile 206 is generated based upon intersecting of image regions based upon the image region's respective seam lines generated from node to pixel location assignments.

In another example, the segmentation component 204 may be configured to execute pair-wise image segmentation upon a pair of intersecting images to generate a seam line between a first image region corresponding to a first image of the pair of intersecting images and a second image region corresponding to a second image of the pairing of intersecting images It may be appreciated that nodes may be designated as unassigned because more than one image attempted to claim the node. That is, a node may be assigned to no more than one image; otherwise the node is designated as unassigned. For example, a subset of nodes within the mosaic tile 202 may be retained (e.g., the node to pixel location assignment is retained) because the nodes within the subset of nodes belong to no more than one image region, while nodes outside of the subset of nodes may be designated as unassigned nodes. It may be appreciated that a node may be assigned no more than one image because respective pixels within the composed mosaic tile 206 may comprise no more than one source of pixel data.

The node assignment component 208 may be configured to execute an alpha-expansion algorithm upon hole regions within the composed mosaic tile 206 to fills holes in the composed mosaic tile 206 to generate a substantially seamless mosaic tile 210. The alpha-expansion algorithm may be configured to assign unassigned nodes to images within the composed mosaic tile 206 based upon costs defined by one or more edges of nodes. The node assignment component 208 may be configured to constrain the alpha-expansion algorithm from reassigning previously assigned nodes.

The presentation component 212 may be configured to generate a mosaic image based upon one or more substantially seamless mosaic tiles (e.g., the substantially seamless mosaic tile 210). The presentation component 212 may be configured to present the mosaic image to a user, for example, through a webpage.

Figure 3:
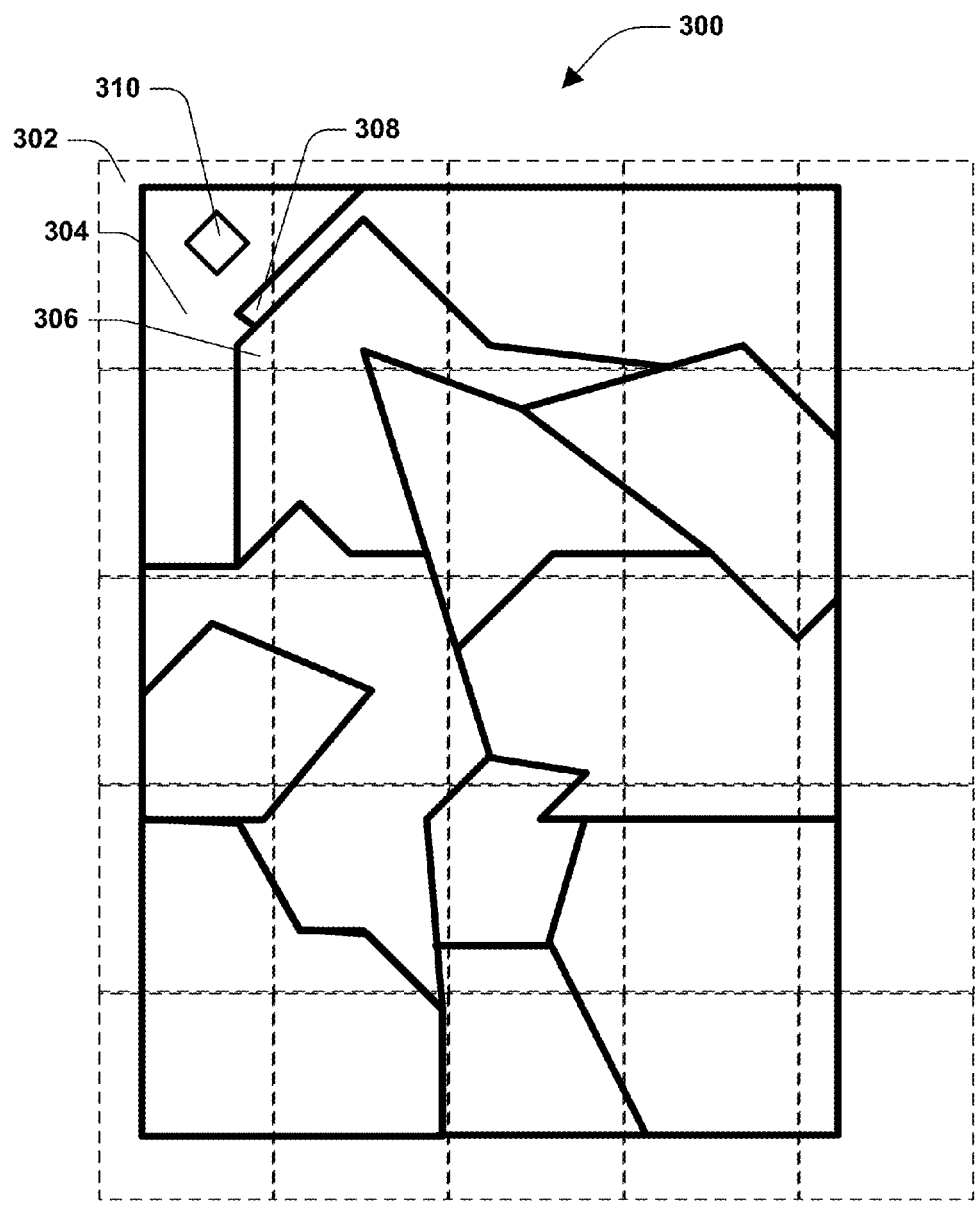
FIG. 3 is an illustration of an example of a mosaic tile comprising multiple images.

FIG. 3 illustrates an example of a mosaic 300 comprise multiple images. The mosaic 300 may be split into multiple mosaic tiles for concurrent processing. For example, the mosaic 300 is split into 25 mosaic tiles arranged as a 5 by 5 grid represented by dashed lines. A mosaic tile 302 may comprise one or more images intersecting the mosaic tile 302. For example, image (1) 304, image (2) 306, image (3) 308, and image (4) 310 intersect the mosaic tile 302. Splitting the mosaic 300 into mosaic tiles allows for concurrent processing of the mosaic tiles. Because mosaic tiles may be processed in parallel, it may be advantageous to generate mosaic tiles with desirable boundaries to mitigate distortion and artifacts between processed mosaic tiles. That is, the more seamless a mosaic tile boundary, the less distortion may occur when combining the mosaic tile back into the mosaic 300 after processing.

Figure 4:
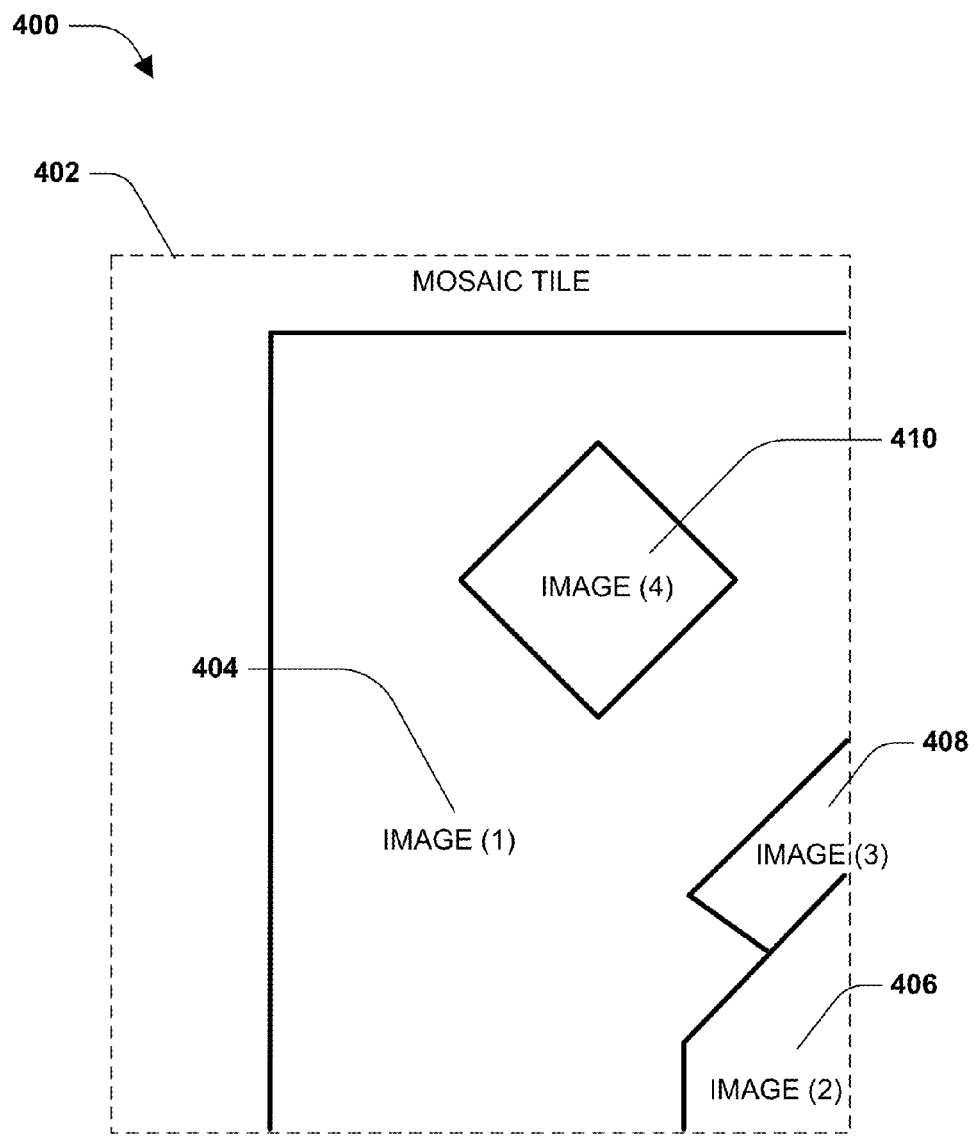
FIG. 4 is an illustration of an example of a mosaic tile.

FIG. 4 illustrates an example 400 of a mosaic tile 402. The mosaic tile 402 may comprise one or more images intersecting the mosaic tile 402. For example, image (1) 404, image (2) 406, image (3) 408, and image (4) 410 intersect the mosaic tile 402. It may be appreciated that during processing of the mosaic tile 402, seam lines (boundaries) between respective images (1-4) may be generated.

Figure 5:
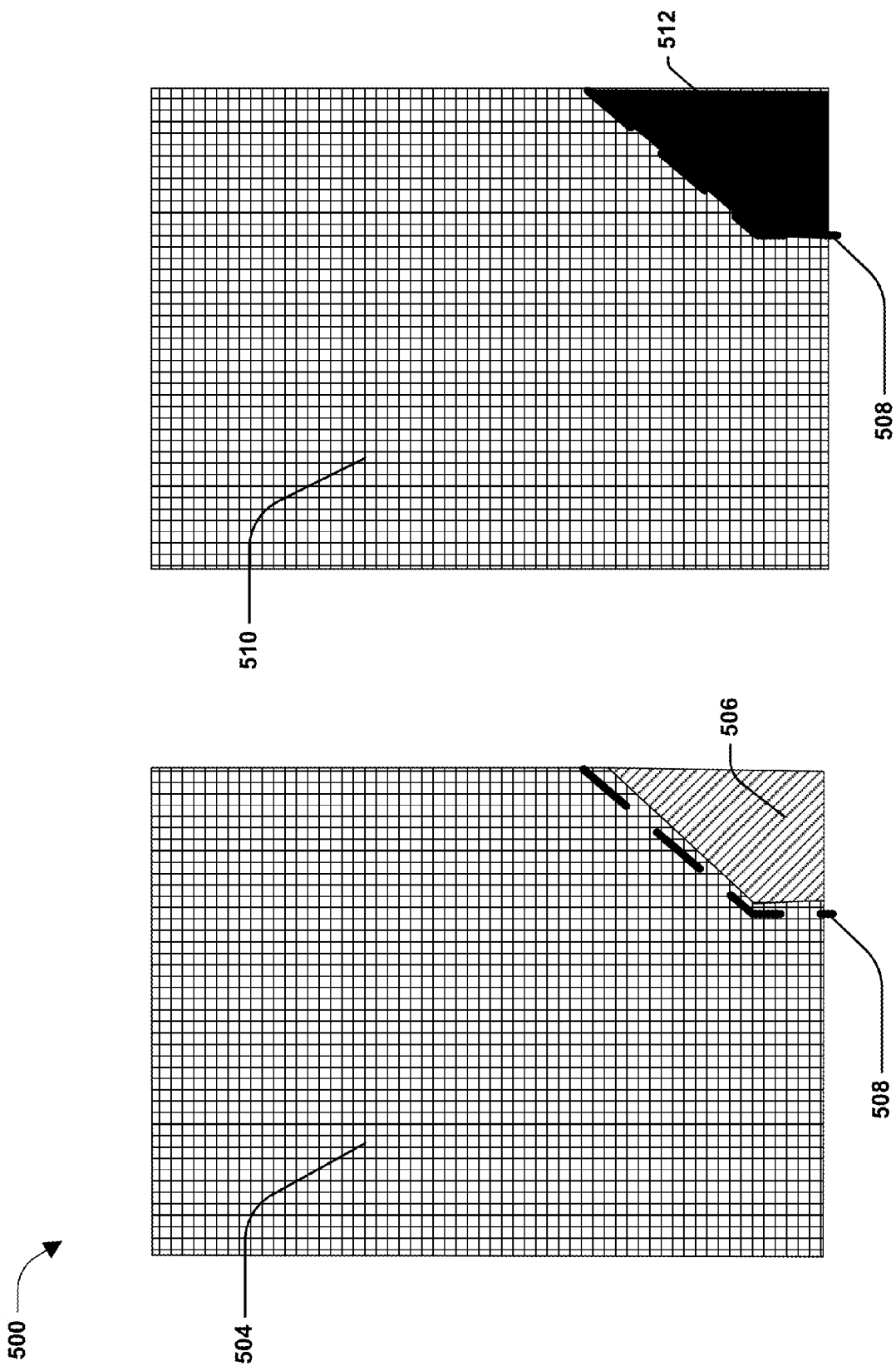
FIG. 5 is an illustration of an example of generating a seam line between a pair of intersecting images using pair-wise image segmentation.

FIG. 5 illustrates an example 500 of generating a seam line 508 between a pair of intersecting images using pair-wise image segmentation. A mosaic tile (e.g., the mosaic tile 402 of FIG. 4) may comprise one or more images intersecting the mosaic tile. Within the mosaic tile, images may intersect one another. Pair-wise segmentation may be executed upon pairs of intersecting images to produce seam lines between the pairs of segmented images based node to pixel location assignments. A seam line may, for example, be a boundary between a first image and a second image of the pair of segmented images. It may be appreciated that in one example, one or more pairs of intersecting images may be processed concurrently.

In one example, a pair of intersecting images may comprise image (1) 504 (e.g., image (1) 404 of FIG. 4) and image (2) 506 (e.g., image (2) 406 of FIG. 4). Pair-wise segmentation may be executed upon image (1) 504 and image (2) 506 to generate the seam line 508. For example, a graph may be generated comprising nodes representing pixel locations of image (1) 504 and image (2) 506. Edges comprising costs may be generated between adjacent nodes within the graph. Nodes may be assigned to either image (1) 504 or image (2) 506 based upon a maxflow/mincut algorithm. In this way, node to pixel location assignments are generated. For example, image (1) nodes 510 are associated with image (1) 504 and image (2) nodes 512 are associated with image (2) 506. The seam line 508 may be a boundary between the image (1) nodes 510 and the image (2) nodes 512, for example.

Figure 6:
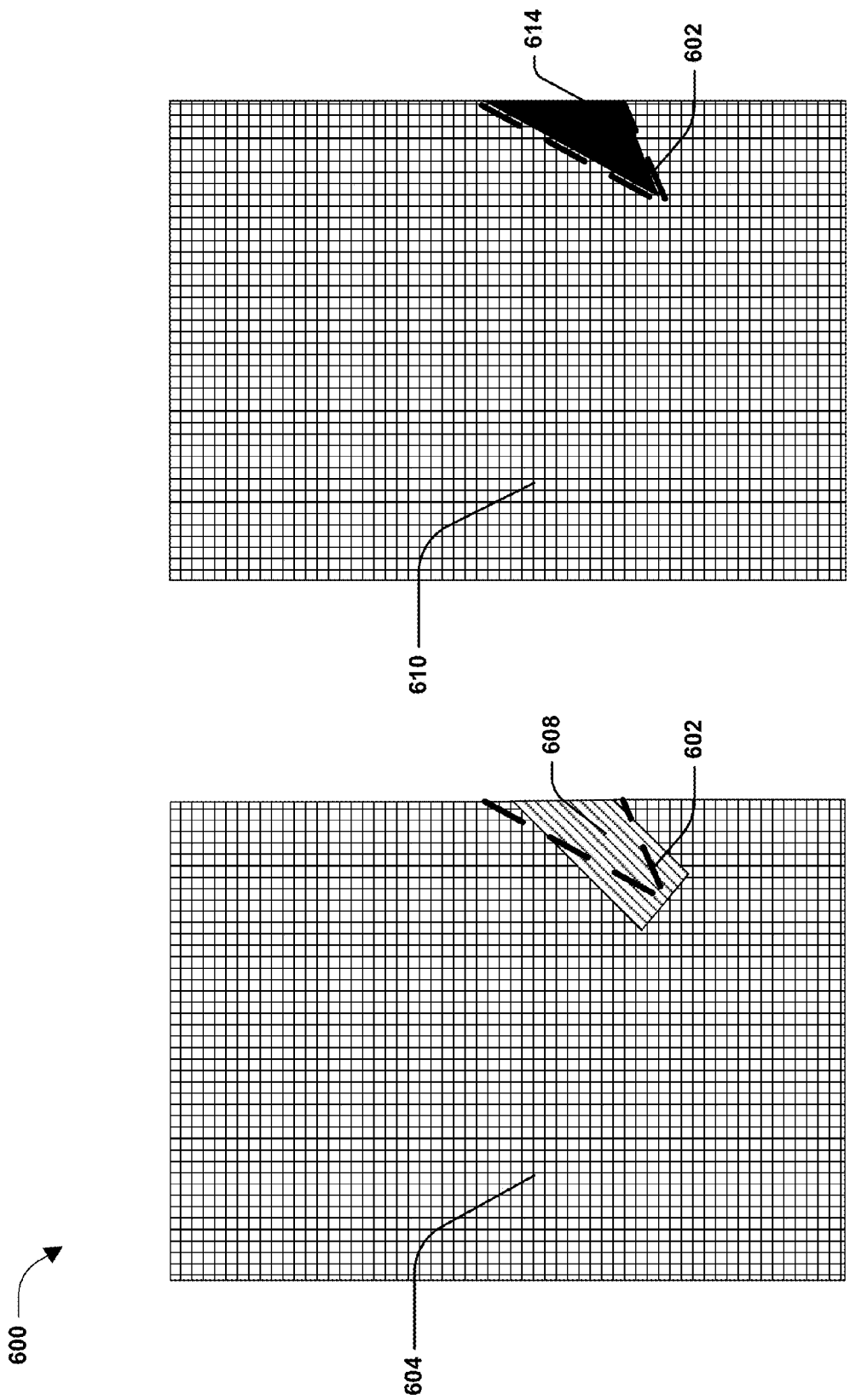
FIG. 6 is an illustration of an example of generating a seam line between a pair of intersecting images using pair-wise image segmentation.

FIG. 6 illustrates an example 600 of generating a seam line 602 between a pair of intersecting images using pair-wise image segmentation. A mosaic tile (e.g., the mosaic tile 402 of FIG. 4) may comprise one or more images intersecting the mosaic tile. Within the mosaic tile, images may intersect one another. Pair-wise segmentation may be executed upon pairs of segmented images to produce seam lines between the pairs of segmented images based upon node to pixel location assignments.

In one example, a pair of intersecting images may comprise image (1) 604 (e.g., image (1) 404 of FIG. 4) and image (3) 608 (e.g., image (3) 408 of FIG. 4). Pair-wise segmentation may be executed upon image (1) 604 and image (3) 608 to generate the seam line 602. For example, a graph may be generated comprising nodes representing pixel locations of image (1) 604 and image (3) 608. Edges comprising costs may be generated between adjacent nodes within the graph. Nodes may be assigned to either image (1) 604 or image (3) 608 based upon a maxflow/mincut algorithm. In this way, node to pixel location assignments are generated. For example, image (1) nodes 610 are associated with image (1) 604 and image (3) nodes 614 are associated with image (3) 608. The seam line 602 may be a boundary between the image (1) nodes 610 and the image (3) nodes 614, for example.

FIG. 7 illustrates an example 700 of generating a seam line 702 between a pair of intersecting images using pair-wise image segmentation. A mosaic tile (e.g., the mosaic tile 402 of FIG. 4) may comprise one or more images intersecting the mosaic tile. Within the mosaic tile, images may intersect one another. Pair-wise segmentation may be executed upon pairs of segmented images to produce seam lines between the pairs of segmented images based upon node to pixel location assignments.

In one example, a pair of intersecting images may comprise image (2) 706 (e.g., image (2) 406 of FIG. 4) and image (3) 708 (e.g., image (3) 408 of FIG. 4). Pair-wise segmentation may be executed upon image (2) 706 and image (3) 708 to generate the seam line 702. For example, a graph may be generated comprising nodes representing pixel locations of image (2) 706 and image (3) 708. Edges comprising costs may be generated between adjacent nodes within the graph. Nodes may be assigned to either image (2) 706 or image (3) 708 based upon a maxflow/mincut algorithm. In this way, node to pixel location assignments are generated. For example, image (2) nodes 710 are associated with image (2) 706 and image (3) nodes 712 are associated with image (3) 708. The seam line 702 may be a boundary between the image (2) nodes 710 and the image (3) nodes 712, for example.

Figure 8:
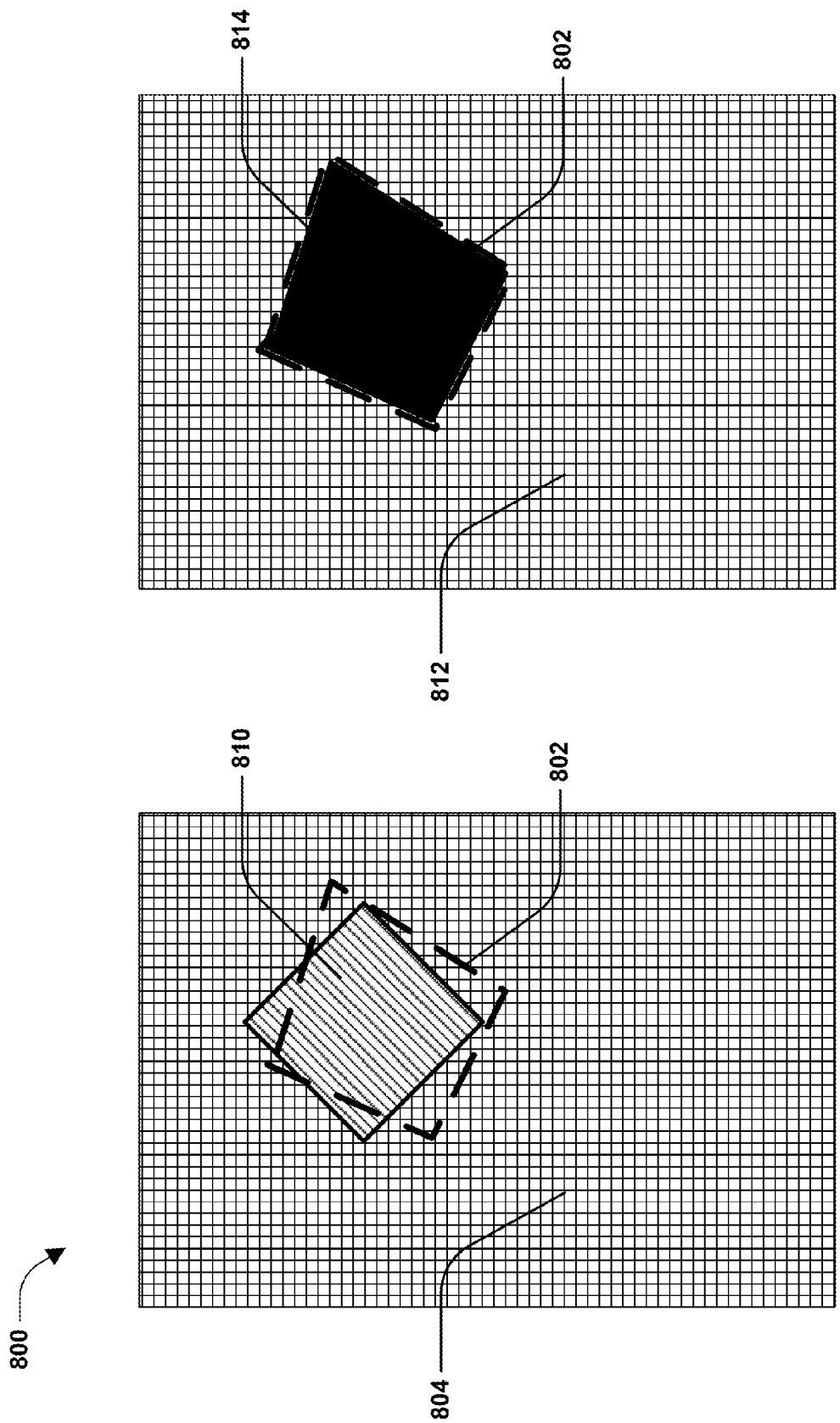
FIG. 8 is an illustration of an example of generating a seam line between a pair of intersecting images using pair-wise image segmentation.

FIG. 8 illustrates an example 800 of generating a seam line 802 between a pair of intersecting images using pair-wise image segmentation. A mosaic tile (e.g., the mosaic tile 402 of FIG. 4) may comprise one or more images intersecting the mosaic tile. Within the mosaic tile, images may intersect one another. Pair-wise segmentation may be executed upon pairs of segmented images to produce seam lines between the pairs of segmented images based upon node to pixel location assignments.

In one example, a pair of intersecting images may comprise image (1) 804 (e.g., image (1) 404 of FIG. 4) and image (4) 810 (e.g., image (4) 410 of FIG. 4). Pair-wise segmentation may be executed upon image (1) 804 and image (4) 810 to generate the seam line 802. For example, a graph may be generated comprising nodes representing pixel locations of image (1) 804 and image (4) 810. Edges comprising costs may be generated between adjacent nodes within the graph. Nodes may be assigned to either image (1) 804 or image (4) 810 based upon a maxflow/mincut algorithm. In this way, node to pixel location assignments are generated. For example, image (1) nodes 812 are associated with image (1) 804 and image (4) nodes 814 are associated with image (4) 810. The seam line 802 may be a boundary between the image (1) nodes 812 and the image (4) nodes 814, for example.

FIG. 9 illustrates an example 900 of a composed mosaic tile 902. The composed mosaic tile 902 may be generated based upon seam lines of corresponding pairs of intersecting images. That is, pair-wise segmentation may be performed upon pairs of intersecting images to generate seam lines between the pairs of intersecting images (see e.g., FIGS. 5-8). During generation of the composed mosaic tile 902, image regions corresponding to images within the composed mosaic tile 902 may be intersected with one another based upon their respective seam lines. It may be appreciated that in one example, an image may be represented by an image region comprising image nodes assigned to the image.

One or more image regions may overlap within the composed mosaic tile 902 because seam lines may, for example, be generated independent of one another (e.g., a first seam line of a first pair of intersecting images and a second seam line of a second pair of intersecting images may be generated concurrently). This overlap may result in assignment of nodes to more than one image. It may be appreciated that nodes assigned to more than one image may be designated as unassigned nodes or "holes", while nodes assigned to no more than one image retain their assignment.

In one example, the composed mosaic tile 902 comprises image (1) nodes 904, image (2) nodes 906, image (3) nodes 908, and image (4) nodes 910. The image nodes may have been assigned, for example, based upon pair-wise segmentation. The composed mosaic tile 902 may have been generated based upon intersection of image regions. It may be appreciated that in one example, image regions may be interpreted as nodes assigned to an image (e.g., image region (3) corresponds to image (3) nodes 908). Holes may be created within the composed mosaic tile 902 because of unassigned nodes resulting from overlap of image nodes. For example, hole region (1) 912 may be created when image (1) nodes 904 (e.g., image region (1)) and image (2) nodes 906 (e.g., image region (2)) are intersected because the nodes within hole region (1) 912 may have been assigned to both image (1) and image (2). In this way, hole region (2) 914 and hole region (3) 916 may be created during intersection of image regions corresponding to image (1-4) nodes.

FIG. 10 illustrates an example 1000 of generating a substantially seamless mosaic tile 1002 using an alpha-expansion algorithm. The alpha-expansion algorithm may be execute upon hole regions within a composed mosaic tile (e.g., hole region (1) 912, hole region (2) 914, and hole region (3) 916 of FIG. 9). The alpha-expansion algorithm may be executed to assign unassigned nodes to images within a composed mosaic tile based upon costs defined by one or more edges of the unassigned nodes. That is, holes may be filled within the composed mosaic tile (e.g., the composed mosaic tile 902 in FIG. 9) by assigning the unassigned nodes to an image, thus "filling the holes". It may be appreciated that the alpha-expansion algorithm may be constrained from reassigning previously assigned nodes. In this way, the substantially seamless mosaic tile 1002 is generated.

Figure 11:
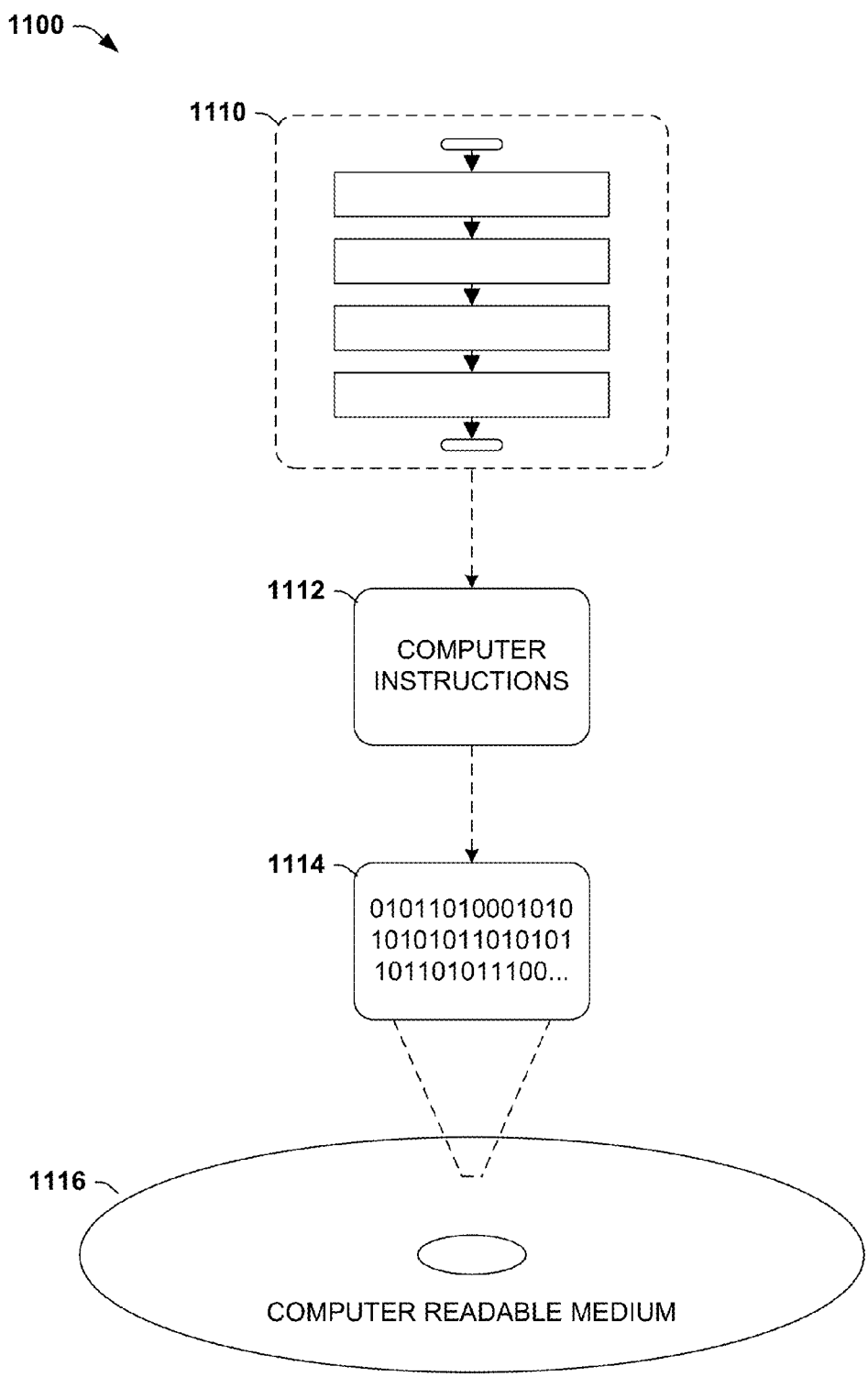
FIG. 11 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1116 (e.g., a CD-R, DVD-R, or a platter of a hard disk drive), on which is encoded computer-readable data 1114. This computer-readable data 1114 in turn comprises a set of computer instructions 1112 configured to operate according to one or more of the principles set forth herein. In one such embodiment 1100, the processor-executable instructions 1112 may be configured to perform a method 1110, such as the exemplary method 100 of FIG. 1, for example. In another such embodiment, the processor-executable instructions 1112 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
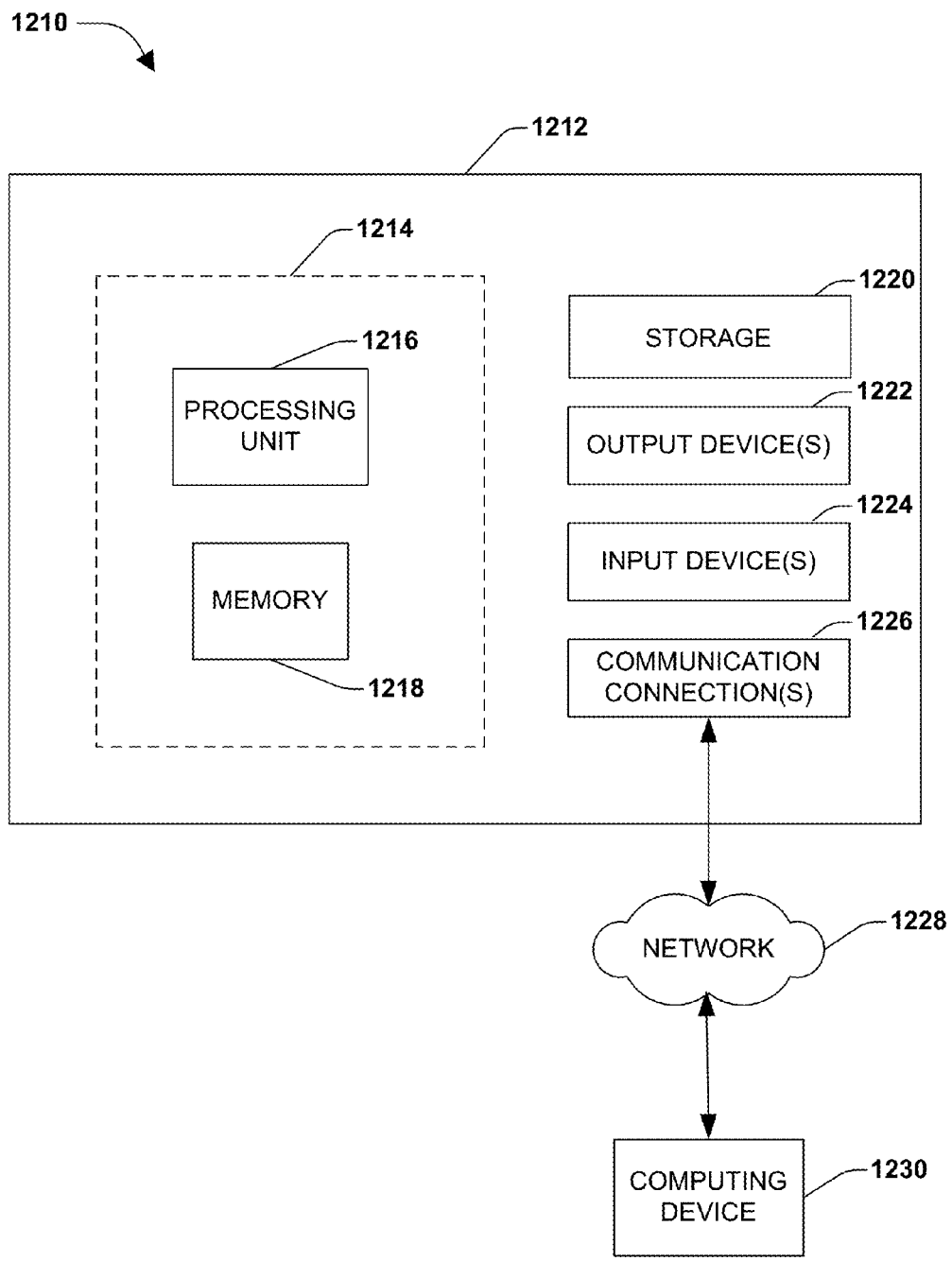
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, microprocessor, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via a network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for generating a substantially seamless mosaic tile, comprising:
   receiving a mosaic tile comprising one or more images intersecting the mosaic tile;
   composing the mosaic tile, comprising:
      for pairs of intersecting images, executing pair-wise image segmentation upon a pair of intersecting images to generate a seam line between the pair of intersecting images based upon a node to pixel location assignment, the executing pair-wise image segmentation comprising:
         generating a graph comprising:
            assigning nodes within the graph to respective pixel locations of an intersection area of the pair of intersecting images; and
            for respective adjacent node pairings within the graph, generating an edge comprising a cost between a first node and a second node of a node pairing; and
         cutting the graph to generate seam lines comprising:
            for respective nodes, assigning a node to either a first image node or a second image node based upon a maxflow/mincut algorithm; and
            generating seam lines between respective pairs of intersecting images based upon node to pixel location assignments; and
         composing the mosaic tile to generate a composed mosaic tile based upon seam lines of respective pairs of intersecting images; and
   executing an alpha-expansion algorithm upon hole regions within the composed mosaic tile to generate a substantially seamless mosaic tile, comprising:
      for unassigned nodes within a hole region of the composed mosaic tile, assigning an unassigned node to either a first image adjacent the unassigned node, where the first image is within the composed mosaic tile, or a second image adjacent the unassigned node, where the second image is within the composed mosaic tile, based upon one or more costs to mitigate hole regions, where, prior to the executing an alpha-expansion algorithm, the unassigned nodes are not assigned to any images,
   at least some of the method implemented at least in part via a processing unit.

2. The method of claim 1, comprising:
   constraining the alpha-expansion algorithm based upon the node to pixel location assignments.

3. The method of claim 1, comprising:
   generating multiple substantially seamless mosaic tiles concurrently.

4. The method of claim 1, comprising:
   generating a mosaic image based upon one or more substantially seamless mosaic tiles.

5. The method of claim 4, comprising:
   presenting the mosaic image to a user.

6. The method of claim 1, the mosaic tile comprising a digital elevation model.

7. The method of claim 1, the cost corresponding at least one of:
   a pixel color difference; or
   an intensity gradient.

8. The method of claim 1, the composing the mosaic tile comprising:
   for respective images within the mosaic tile, intersecting one or more image regions overlapping at least a portion of a particular image based upon respective seam lines of the one or more image regions.

9. The method of claim 8, the intersecting comprising:
   retaining node to pixel location assignments of a subset of nodes within the mosaic tile, where respective nodes within the subset of nodes belong to no more than one image region; and
   designating nodes outside of the subset of nodes as unassigned nodes.

10. A system, implemented at least in part via a processing unit, configured to generate a substantially seamless mosaic tile, comprising:
    one or more processing units; and
    memory comprising instructions that when executed by at least one of the one or more processing units implement at least some of:
       a segmentation component configured to:
          receive a mosaic tile comprising one or more images intersecting the mosaic tile;
          for pairs of intersecting images, execute a pair-wise image segmentation upon a pair of intersecting images to generate a seam line between the pair of intersecting images based upon a node to pixel location assignment, the pair-wise segmentation configured to:
             generate a graph by:
                assigning nodes within the graph to respective pixel locations of an intersection area of the pair of intersecting images; and
                for respective adjacent node pairings within the graph, generating an edge comprising a cost between a first node and a second node of a node pairing; and
             cut the graph to generate seam lines by:
                for respective nodes, assigning a node to either a first image node or a second image node based upon a maxflow/mincut algorithm; and
                generating seam lines between respective pairs of intersecting images based upon node to pixel location assignments; and
          compose the mosaic tile to generate a composed mosaic tile based upon seam lines of respective pairs of intersecting images; and
       a node assignment component configured to:
       execute an alpha-expansion algorithm upon hole regions within the composed mosaic tile to generate a substantially seamless mosaic tile, the alpha-expansion algorithm configured to, for unassigned nodes within a hole region of the composed mosaic tile, assign an unassigned node to either a first image adjacent the unassigned node, where the first image is within the composed mosaic tile, or a second image adjacent the unassigned node, where the second image is within the composed mosaic tile, based upon one or more costs to mitigate hole regions, where, prior to the executing an alpha-expansion algorithm, the unassigned nodes are not assigned to any images.

11. The system of claim 10, the node assignment component configured to:
    constrain the alpha-expansion algorithm based upon the node to pixel location assignments.

12. The system of claim 10, the segmentation component configured to compose multiple mosaic tiles concurrently.

13. The system of claim 10, the segmentation component configured to:
intersect one or more image regions overlapping at least a portion of a particular image based upon respective seam lines of the one or more image regions.

14. The system of claim 13, the segmentation component configured to:
retain node to pixel location assignments of a subset of nodes within the mosaic tile, where respective nodes within the subset of nodes belong to no more than one image region; and
designate nodes outside of the subset of nodes as unassigned nodes.

15. The system of claim 10, the cost corresponding to at least one of:
a pixel color difference; or
an intensity gradient.

16. The system of claim 10, comprising:
a presentation component configured to:
generate a mosaic image based upon one or more substantially seamless mosaic tiles.

17. The system of claim 16, the presentation component configured to:
present the mosaic image to a user.

18. A computer readable device comprising instructions that when executed perform operations for generating a substantially seamless mosaic tile, comprising:
receiving a mosaic tile comprising one or more images intersecting the mosaic tile;
composing the mosaic tile, comprising:
for pairs of intersecting images, executing pair-wise image segmentation upon a pair of intersecting images to generate a seam line between the pair of intersecting images based upon a node to pixel location assignment, the executing pair-wise image segmentation comprising:
generating a graph comprising:
assigning nodes within the graph to respective pixel locations of an intersection area of the pair of intersecting images; and
for respective adjacent node pairings within the graph, generating an edge comprising a cost between a first node and a second node of a node pairing; and
cutting the graph to generate seam lines comprising:
for respective nodes, assigning a node to either a first image node or a second image node based upon a maxflow/mincut algorithm; and
generating seam lines between respective pairs of intersecting images based upon node to pixel location assignments; and
composing the mosaic tile to generate a composed mosaic tile based upon seam lines of respective pairs of intersecting images; and
executing an alpha-expansion algorithm upon hole regions within the composed mosaic tile to generate a substantially seamless mosaic tile, comprising:
for unassigned nodes within a hole region of the composed mosaic tile, assigning an unassigned node to either a first image adjacent the unassigned node, where the first image is within the composed mosaic tile, or a second image adjacent the unassigned node, where the second image is within the composed mosaic tile, based upon one or more costs to mitigate hole regions, where, prior to the executing an alpha-expansion algorithm, the unassigned nodes are not assigned to any images.

19. The computer readable device of claim 18, the operations comprising:
constraining the alpha-expansion algorithm based upon the node to pixel location assignments.

20. The computer readable device of claim 18, the operations comprising:
generating a mosaic image based upon one or more substantially seamless mosaic tiles.

* * * * *